(12) United States Patent
Takeda et al.

(10) Patent No.: US 11,310,778 B2
(45) Date of Patent: Apr. 19, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 36 days.

(21) Appl. No.: 16/609,431

(22) PCT Filed: May 2, 2017

(86) PCT No.: PCT/JP2017/017308
§ 371 (c)(1),
(2) Date: Oct. 29, 2019

(87) PCT Pub. No.: WO2018/203409
PCT Pub. Date: Nov. 8, 2018

(65) Prior Publication Data
US 2020/0196302 A1 Jun. 18, 2020

(51) Int. Cl.
*H04W 72/04* (2009.01)
(52) U.S. Cl.
CPC ... *H04W 72/0413* (2013.01); *H04W 72/0446* (2013.01)
(58) Field of Classification Search
None
See application file for complete search history.

(56) References Cited

U.S. PATENT DOCUMENTS

| 10,536,975 | B2 * | 1/2020 | Hosseini | H04W 72/0446 |
| 2017/0195890 | A1 * | 7/2017 | Chen | H04L 5/001 |
| 2017/0273071 | A1 * | 9/2017 | Nogami | H04W 74/085 |
| 2018/0110042 | A1 * | 4/2018 | Chen | H04L 5/0057 |
| 2018/0375619 | A1 * | 12/2018 | Hwang | H04W 72/0446 |
| 2019/0110311 | A1 * | 4/2019 | Falconetti | H04W 72/0453 |
| 2019/0116611 | A1 * | 4/2019 | Lee | H04W 72/1278 |
| 2019/0182867 | A1 * | 6/2019 | Hosseini | H04W 52/367 |

FOREIGN PATENT DOCUMENTS

| WO | 2017/171615 A1 | 10/2017 |
| WO | 2018/144155 A1 | 8/2018 |

OTHER PUBLICATIONS

International Search Report issued in PCT/JP2017/017308 dated Jul. 25, 2017 (1 page).

(Continued)

*Primary Examiner* — Brian S Roberts
(74) *Attorney, Agent, or Firm* — Osha Bergman Watanabe & Burton LLP

(57) ABSTRACT

The present invention is designed so that UCI can be transmitted properly even when a PUSCH of a long TTI and an sPUSCH of a short TTI collide with each other in a same carrier. According to the present invention, a user terminal has a transmission section that transmits UCI, and a control section that controls re-direction of at least part of the UCI, when a PUSCH of a long TTI carrying the UCI, and an sPUSCH of a short TTI, collide with each other in a same carrier.

3 Claims, 13 Drawing Sheets

(56) References Cited

OTHER PUBLICATIONS

Written Opinion of the International Searching Authority issued in PCT/JP2017/017308 dated Jul. 25, 2017 (4 pages).
Huawei, HiSilicon; "Handling collisions of sTTI/TTI in UL"; 3GPP TSG RAN WG1 Meeting #88, R1-1701741; Athens, Greece; Feb. 13-17, 2017 (10 pages).
Qualcomm Incorporated; "1ms TTI and sTTI Collision in the Uplink"; 3GPP TSG RAN WG1 #88, R1-1702559; Athens, Greece; Feb. 13-17, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
3GPP TSG RAN WG1 Meeting #88bis; R1-1705686 "Collision handling between sTTI and TTI for UL" NTT DOCOMO, Inc.; Spokane, USA; Apr. 3-7, 2017 (5 pages).
3GPP TSG RAN WG1 #88b; R1-1704985 "1 ms TTI and sTTI Collision in the Uplink" Qualcomm Incorporated; Spokane, USA; Apr. 3-7, 2017 (3 pages).
3GPP TSG RAN WG1 Meeting #86bis; R1-1608640 "Handling collision between sTTI and 1ms TTI" Huawei, HiSilicon; Lisbon, Portugal; Oct. 10-14, 2016 (5 pages).
Extended European Search Report issued in European Application No. 17908140.1, dated Oct. 30, 2020 (11 pages).
3GPP TSG-RAN WG1 Meeting #88bis; R1-1706073 "Handling collisions of sTTI and TTI in UL" Ericsson; Spokane, USA; Apr. 3-7, 2017 (4 pages).
3GPP TSG RAN WG1 Meeting #88; R1-1702420 "Discussion on UL collisions between 1ms TTI and sTTI" LG Electronics; Athens, Greece; Feb. 13-17, 2017 (4 pages).
3GPP TSG RAN WG1 Meeting #88; R1-1702002 "UCI on sPUSCH" Nokia, Alcatel-Lucent Shanghai Bell; Athens, Greece; Feb. 13-17, 2017 (2 pages).
Office Action issued in Japanese Application No. 2019-516345; dated Jun. 15, 2021 (6 pages).
Office Action in counterpart European Application No. 17 908 140.1 dated Sep. 24, 2021 (6 pages).
Huawei, HiSilicon; "Discussion on collision of sTTI/TTI in UL"; 3GPP TSG RAN WG1 Meeting #88bis, R1-1704262; Spokane, USA; Apr. 3-7, 2017 (9 pages).

* cited by examiner

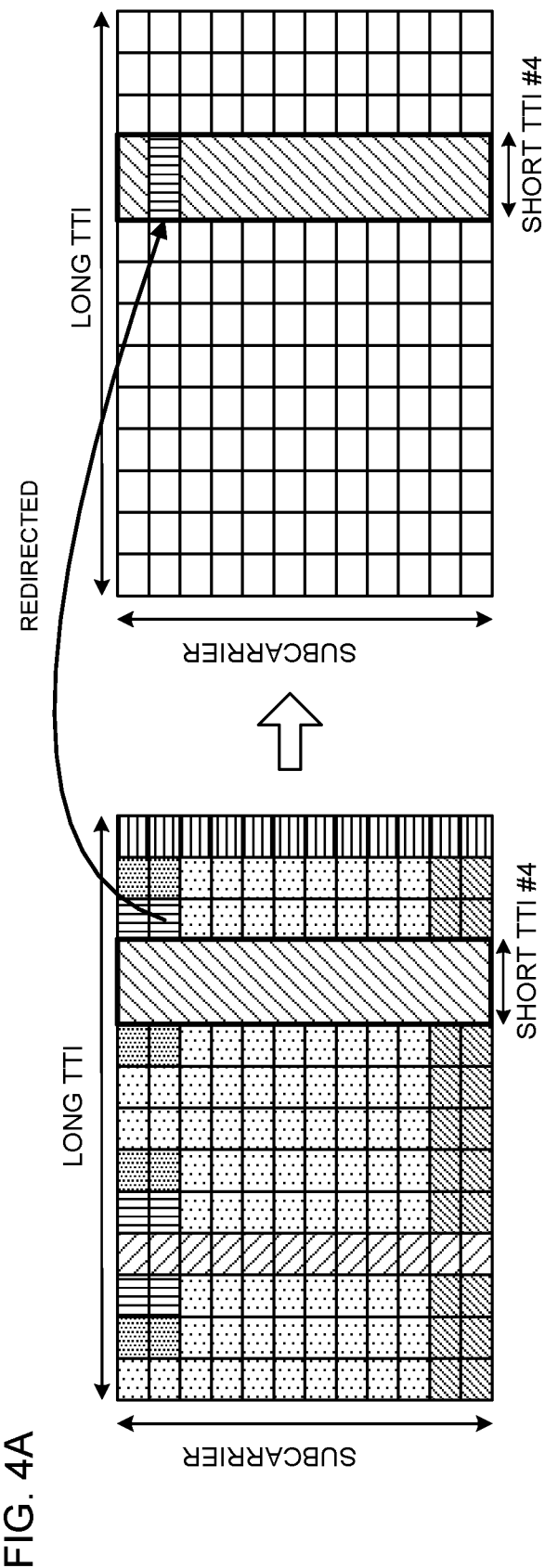
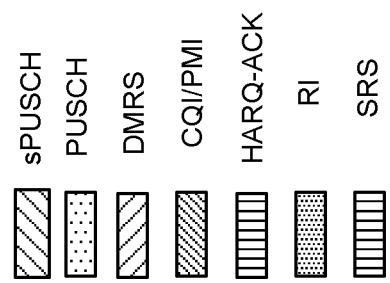
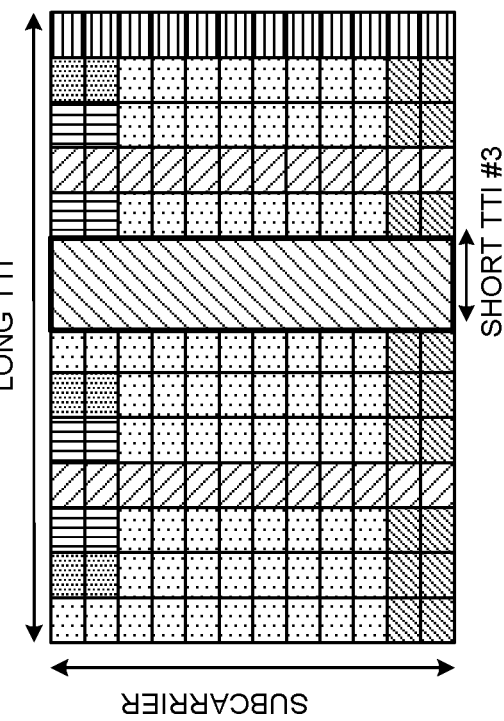
FIG. 4A
FIG. 4B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 cell (CC, cell, etc.). In DC, since a number of carriers of different radio base stations are integrated, DC is also referred to as "inter-base-station CA (inter-eNB CA)."

Furthermore, in existing LTE systems (for example, in LTE Rel. 8 to 13), downlink (DL) and/or uplink (UL) communication are carried out using 1-ms transmission time intervals (TTIs). A 1-ms TTI is the fundamental unit of time for transmitting one channel-encoded data packet, and serves as the processing unit in scheduling, link adaptation and so on. A TTI of 1 ms is also referred to as a "subframe," a "subframe length" and so forth.

Also, in existing LTE systems (for example, LTE Rel. 8 to 13), a user terminal transmits uplink control information (UCI) by using a UL data channel (for example, PUSCH (Physical Uplink Control CHannel)) and/or a UL control channel (for example, PUCCH (Physical Uplink Control CHannel)).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 and later versions, 5G, NR, etc.), studies are in progress to support multiple TTIs having different time lengths (for example, TTIs having a relatively long time length (also referred to as "long TTIs," "first TTIs," etc.)), TTIs having a relatively short time length (also referred to as "short TTIs," "second TTIs," etc.) in order to make possible reduced latency (latency reduction).

In this way, in future radio communication systems where long TTIs and short TTIs will be supported, a UL data channel of a long TTI (for example, a PUSCH) and a UL data channel of a short TTI (for example, a PUSCH (also referred to as "sPUSCH," etc.)) might collide with each other in a same carrier (also referred to as "CC," "cell," etc.). When a collision like this occurs, it is likely that a user terminal will stop (or drop) transmitting the long-TTI PUSCH, and transmit the short-TTI sPUSCH.

However, if the long-TTI PUSCH carrying UCI and the short-TTI sPUSCH collide with each other in a same carrier and the user terminal stops (or drops) transmitting the long-TTI PUSCH, there is a risk that the UCI cannot be transmitted.

The present invention has been made in view of the above, and it is therefore an object of the present invention to provide a user terminal and a radio communication method, whereby UCI can be transmitted properly even when a PUSCH of a long TTI and an sPUSCH of a short TTI collide with each other in a same carrier.

Solution to Problem

According to one aspect of the present invention, a user terminal has a transmission section that transmits uplink control information (UCI), and a control section that controls re-direction of at least part of the UCI, when an uplink (UL) data channel of a first transmission time interval (TTI), carrying the UCI, and a UL data channel of a second TTI, which is shorter than the first TTI, collide with each other in a same carrier.

Advantageous Effects of Invention

According to the present invention, UCI can be transmitted properly even when a PUSCH of a long TTI and an sPUSCH of a short TTI collide with each other in a same carrier.

BRIEF DESCRIPTION OF DRAWINGS

FIGS. 4A and 4B are diagrams to show examples of second intra-carrier re-directing control according to the first example;

DESCRIPTION OF EMBODIMENTS

Figure 1:
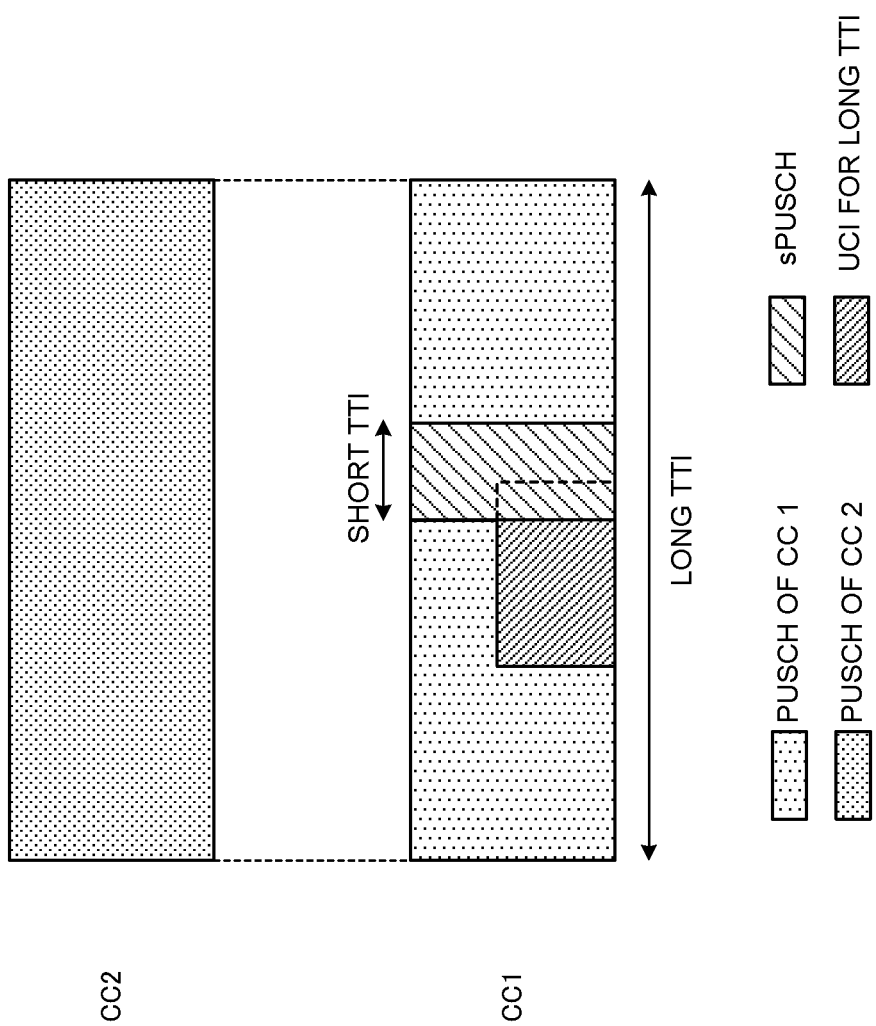
FIG. 1 is a diagram to show an example of a collision between a PUSCH of a long TTI and an sPUSCH of a short TTI.

In existing LTE systems (for example, LTE Rel. 8 to 13), a user terminal performs DL and/or UL communication by using 1-ms TTIs. A 1-ms TTI has a time length of 1 ms. A 1-ms TTI is also referred to as a "TTI," a "subframe," a "normal TTI," a "long TTI," a "normal subframe," a "long subframe," and the like, and is constituted by 2 slots. Also, a cyclic prefix (CP) is appended to every symbol in a 1-ms TTI.

Envisaging future radio communication systems (for example, LTE Rel. 14 and later versions, 5G, NR, etc.), research is in progress to support multiple TTIs of different time lengths (for example, long TTIs and short TTIs). A long TTI may have, for example, a TTI length of 1 ms, as in existing LTE systems, and may be comprised of fourteen symbols when normal CP is used. A short TTI has a TTI length shorter than a long TTI, and may be comprised of, for example, two, three or seven symbols in the event normal CP is used.

Also, in future radio communication systems, it may be possible that a user terminal will communicate using short TTIs and long TTIs in a same carrier (CC, cell, etc.). Furthermore, for example, carrier aggregation (CA) or dual connectivity (DC) may be used, so that a user terminal might communicate using multiple carriers (CCs, cells, etc.) where short TTIs and/or long TTIs are used.

In this way, future radio communication systems will allow the use of long TTIs and short TTIs in a same carrier, but, on the other hand, will not allow simultaneous transmission of a PUSCH of a long TTI (a PUSCH to be scheduled with a long TTI) and an sPUSCH of a short TTI (an sPUSCH to be scheduled with a short TTI) in a same carrier.

It then follows that, in the future radio communication systems, when a PUSCH of a long TTI and an sPUSCH of a short TTI collide with each other in a same carrier, a user terminal might transmit the short-TTI sPUSCH, and stop transmitting the long-TTI PUSCH, or drop the long-TTI PUSCH.

Now, in existing LTE systems (for example, LTE Rel. 8 to 13), a user terminal transmits UCI using a PUSCH or a PUCCH. To be more specific, when user terminal transmits a PUSCH in a TTI carrying UCI, the UCI is transmitted using the PUSCH (piggybacked on the PUSCH).

However, when, in future radio communication systems, transmission of UCI is controlled using the same or similar methods as in existing LTE systems (for example, LTE Rel. 8 to 13), there is a danger that the UCI may not be transmitted properly. For example, when, in future radio communication systems, a PUSCH of a long TTI carrying UCI and an sPUSCH of a short TTI collide with each other in a same carrier, and the user terminal stops transmitting the long-TTI PUSCH, this UCI may not be transmitted properly.

Also, when CA or DC is configured in the UL of a future radio communication system, a PUSCH of a long TTI and/or a PUSCH of a short TTI are scheduled in multiple CCs, and there is a high possibility that the long-TTI PUSCH and the short-TTI sPUSCH collide with each other in at least one of the CCs.

For example, in FIG. 1, CA or DC of CC 1 and CC 2 is configured in a user terminal, and a PUSCH in CC 1 and a PUSCH in CC 2 are scheduled in a long TTI. Also, in FIG. 1, UCI is piggybacked on the PUSCH of CC 1. As shown in FIG. 1, in CC 1, when the PUSCH of the long TTI carrying UCI and the sPUSCH of the short TTI collide with each other, transmitting the short TTI and stopping or dropping the transmission of the long TTI might have a risk that the UCI may not be transmitted properly.

So, presuming that a PUSCH of a long TTI carrying UCI and an sPUSCH of a short TTI collide with each other in a same carrier, the present inventors have worked on the method for transmitting this UCI properly, and arrived at the present invention. To be more specific, the present inventors have come up with the idea of controlling this UCI to be re-directed to the same carrier's sPUSCH (first example), or controlling this UCI to be re-directed to another carrier's sPUSCH or PUSCH (second example).

Now, embodiments of the present invention will be described below in detail with reference to the accompanying drawings. Note that, as used in the herein-contained embodiments, a "long TTI" may be paraphrased as a "subframe," a "slot," and the like. Also, a "short TTI" may be paraphrased as a "slot," a "minislot," a "subslot," and the like.

Note that, all the sPUSCHs shown in the accompanying drawings and described in the present specification may be replaced with PUCCHs of short TTI (sPUCCHs). That is, the invention according to the herein-contained embodiments of the present invention can be applied to cases in which an sPUSCH is replaced by an sPUCCH. More generally, when a PUSCH of a long TTI carrying UCI and a UL channel (for example, an sPUSCH and/or an sPUCCH) of a short TTI collide with each other in a same carrier, the herein-contained embodiments can be applied to the control for re-directing the UCI to that short-TTI UL channel, or the control for re-directing the UCI to another carrier's short-TTI UL channel (for example, an sPUSCH and/or an sPUCCH) or long-TTI UL channel (for example, a PUSCH and/or a PUCCH).

Also, according to the herein-contained embodiments, to "re-direct" means changing the channel to use to transmit UCI. Also, "UCI" may include at least one of delivery acknowledgment information (also referred to as "HARQ-ACK (Hybrid Automatic Repeat reQuest-ACKnowledgement)," "ACK or NACK," "A/N," etc.) in response to DL data (DL data channel, DL shared channel, PDSCH (Physical Downlink Shared CHannel), etc.), a scheduling request (SR), channel state information (CSI), and beam information (BI (Beam Index)). CSI may include at least one of a channel quality indicator (CQI), a rank indicator (RI), and a precoding matrix indicator (PMI).

First Example

Assuming that a PUSCH of a long TTI carrying UCI collides with an sPUSCH of a short TTI in one carrier, a first example of the present invention will describe below control for re-directing the UCI to the short-TTI sPUSCH in a same carrier.

According to the first example, a user terminal may stop (or drop) transmitting the above long-TTI PUSCH, and re-direct at least part of the UCI to the short-TTI sPUSCH (first intra-carrier re-directing control). Alternatively, the user terminal may exert control so that at least part of the UCI is re-directed or not re-directed to the sPUSCH of the short TTI depending on the timing the collision occurs (second intra-carrier re-directing control).

<First Intra-Carrier Re-Directing Control>

According to the first intra-carrier re-directing control, when a PUSCH of a long TTI carrying UCI collides with an sPUSCH of a short TTI in a certain carrier, a user terminal may stop (or drop) transmitting the long-TTI PUSCH regardless of at what timing the collision occurs (the timing is also referred to as the "time position in the long TTI," "symbol," "short TTI," "subslot," "minislot," etc.), and re-direct at least part of the UCI (for example, at least the HARQ-ACK) to the sPUSCH of the short TTI.

The number of HARQ-ACK bits for a long TTI that can be carried in a PUSCH of a long TTI is limited (for example, 1 bit). Therefore, when an sPUSCH of a short TTI transmits UCI for a short TTI, the above HARQ-ACK bits for a long TTI may be appended to the top or the end of the UCI for a short TTI.

Figure 2:
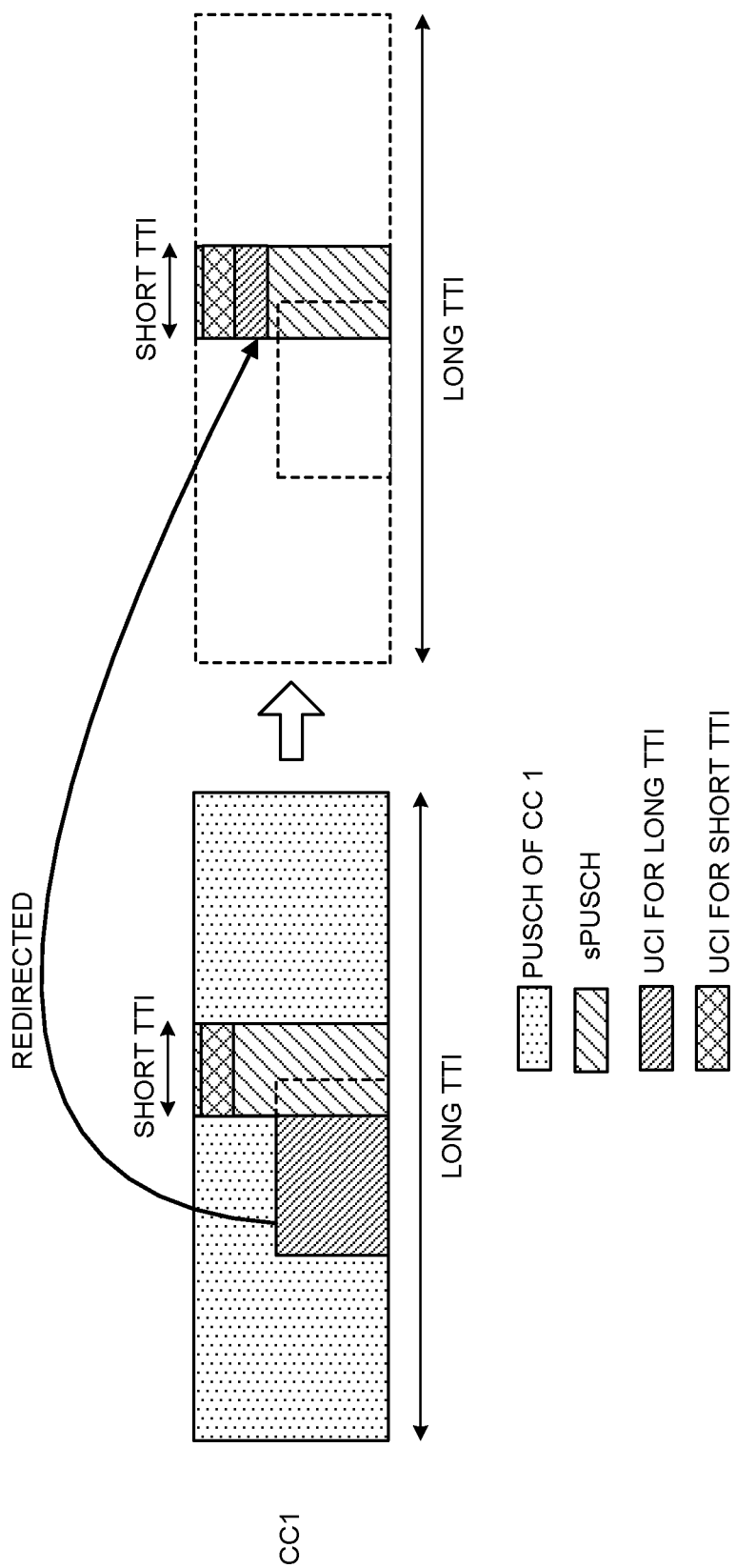
FIG. 2 is a diagram to show an example of first intra-carrier re-directing control according to a first example of the present invention.

FIG. 2 is a diagram to show an example of first intra-carrier re-directing control according to the first example. FIG. 2 exemplifies a case where a PUSCH of a long TTI carrying UCI for a long TTI and an sPUSCH of a short-TTI carrying UCI for a short TTI collide with each other in CC 1. Furthermore, FIG. 2 assumes that the long-TTI PUSCH and the short-TTI sPUSCH are allocated to the same user terminal.

In the case shown in FIG. 2, the user terminal may re-direct at least part of the UCI for a long TTI (for example, at least the HARQ-ACK) to the short-TTI sPUSCH, regardless of at what timing the collision occurs.

To be more specific, as shown in FIG. 2, when the above collision occurs, the user terminal may transmit the short-TTI sPUSCH and stop or drop the transmission of the long-TTI PUSCH. The user terminal may transmit the re-directed UCI for a long TTI, in addition to the UCI for a short TTI, by using the short-TTI sPUSCH.

Note that, in FIG. 2, the user terminal does not have to re-direct the whole UCI for a long TTI to the short-TTI sPUSCH. For example, the user terminal may drop part of the UCI (for example, CSI) without re-directing it. UCI can be dropped based on the UCI's priority. UCI's priority may be, for example, the type of the UCI (HARQ-ACK and/or SR>RI>CQI), the carrier number the UCI corresponds to (the smaller the CC index, the higher the priority), and the like. UCI may be dropped when, for example, the coding rate, which is calculated from the total amount of resources the UCI is mapped to, the payload of the UCI (the number of bits) and the modulation scheme is determined to be less than a predetermined value, or specific types of UCI (for example, CQI) may be controlled so as to be always dropped.

Also, referring to FIG. 2, the UCI for a short TTI and the UCI for a long TTI re-directed to the short-TTI sPUSCH may be joined and encoded (joint-coding), or may be encoded separately (separate coding). Also, when the UCI for a short TTI and the UCI for a long TTI have the same value, the re-direction of the UCI for a long TTI may be suspended.

According to the first intra-carrier re-directing control, when a PUSCH of a long TTI carrying UCI for a long TTI collides with an sPUSCH for a short-TTI in a same carrier, at least part of the UCI is re-directed to the short-TTI sPUSCH, so that a user terminal can transmit the UCI properly.

<Second Intra-Carrier Re-Directing Control>

According to second intra-carrier re-directing control, when a PUCH of a long TTI carrying UCI of the long TTI collides with an sPUSCH of a short TTI in one carrier, the user terminal determines whether or not to re-direct at least part of the UCI to the sPUSCH of the short TTI based on the timing the collision occurs (also referred to as the "time position in the long TTI," the "symbol," the "short TTI," the "subslot," or the "minislot," etc.).

Figure 3:
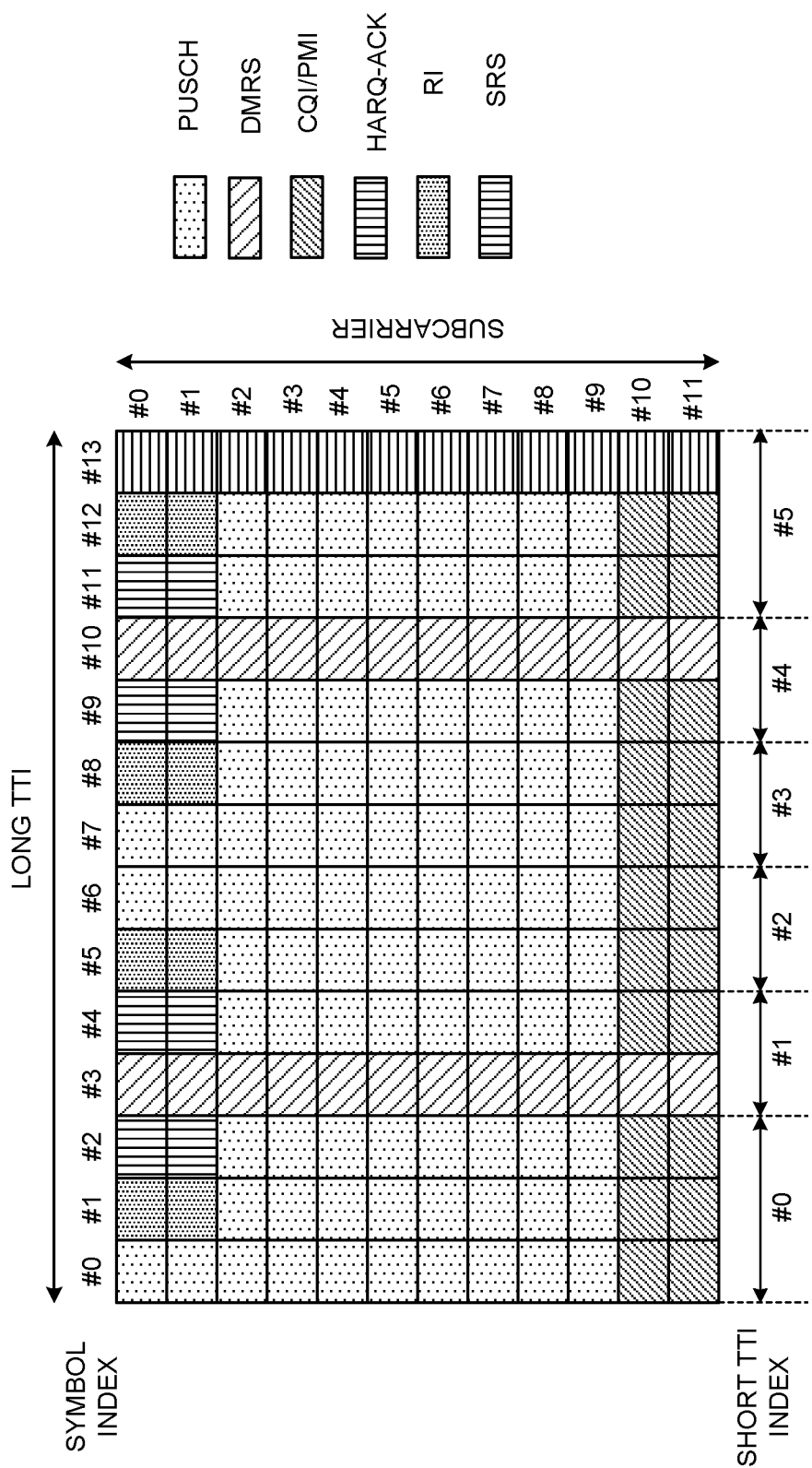
FIG. 3 is a diagram to show an example of a long TTI configuration.

FIG. 3 is a diagram to show an example of a long TTI configuration. In the case illustrated in FIG. 3, the long TTI is comprised of fourteen symbols, and a sounding reference signal (SRS) is mapped to the final symbol. Also, FIG. 3 assumes that UCI for a long TTI is piggy-backed on (mounts on) the PUSCH of the long TTI. Note that FIG. 3 is simply an example, and the mapping of SRS and/or UCI is not limited to that shown in FIG. 3. Also, the SRS may not be mapped.

For example, in FIG. 3, the reference signal (DMRS) for demodulating the PUSCH of the long TTI is mapped to symbols #3 and #10 (symbols at the center of the slot every seven symbols). HARQ-ACKs are distributed and mapped to subcarriers #0 and #1 in symbols #2, #4, #9 and #11, which are adjacent to symbols #3 and #10, respectively, where DMRSs are allocated (DMRS symbols).

Furthermore, RIs are distributed and mapped to subcarriers #0 and #1 in symbols #1, #5, #8 and #12, which are adjacent to symbols #2, #4, #9 and #11, respectively, where HARQ-ACKs are allocated. Also, CQIs and/or PMIs (CQIs/PMIs) are mapped to subcarriers #10 and #11, which are opposite to subcarriers #0 and #1 where HARQ-ACKs and RIs are allocated, except for the symbols where DMRSs and SRSs are allocated.

Also, a long TTI may be comprised of short TTIs comprised of a predetermined number of symbols. For example, referring to FIG. 3, the long TTI includes short TTIs #0 and #5 of three symbols and short TTIs #1 to #4 of two symbols. In FIG. 3, short TTIs #1 and #4 include DMRS symbols #3 and #10 for the long-TTI PUSCH, respectively. On the other hand, short TTIs #0, #2, #3 and #5 do not include DMRS symbols #3 and #10, respectively.

According to the second intra-carrier re-directing control, when a PUSCH of a long TTI carrying UCI of the long TTI and the sPUSCH of short TTI #1 or #4, including DMRS symbols, collide with each other, the transmission of the long-TTI's PUSCH may be stopped (or dropped), and at least part of the UCI (for example, at least the HARQ-ACK) may be re-directed to the sPUSCH of short TTI #1 or #4.

On the other hand, when a PUSCH of a long TTI carrying UCI of the long TTI and the sPUSCH of short TTI #0, #2, #3 or #5, including no DMRS symbols, collide with each other, part of the long-TTI's PUSCH may be punctured, and re-direction to short TTI #0, #2, #3 or #5 may not be necessary. Also, when a PUSCH of a long TTI carrying UCI of the long TTI and the sPUSCH of short TTI #0, #2, #3 or #5, including no DMRS symbols, collide with each other, while part of the long-TTI's PUSCH is punctured and re-direction to short TTI #0, #2, #3 or #5 is made, the PUSCH symbols of the long TTI that are not punctured keep being transmitted.

As described above, whether or not to re-direct at least part of the UCI to the sPUSCH of the short TTI may be controlled not only based on at what timing the collision occurs, but may also be controlled based on whether or not DMRS symbols are included in the short TTI in which the collision occurs.

FIG. 4 is a diagram to show an example of first intra-carrier re-directing control according to the first example. FIG. 4A assumes that a PUSCH of a long TTI carrying UCI of the long TTI (here, HARQ-ACK, RI, CQI/PMI, etc.) and the sPUSCH of short TTI #4, which includes DMRS symbol #10, collide with each other. Meanwhile, FIG. 4B assumes that the PUSCH of the long TTI and the PUSCH of short TTI #3, which includes no DMRS symbols, collide with each other.

In the case illustrated in FIG. 4A, the user terminal may transmit the sPUSCH of short TTI #4, and stop or drop the transmission of the long-TTI PUSCH. Note that, in FIG. 4A, the PUSCH of the long TTI is dropped entirely, but the PUSCH has only to be dropped at and after a predetermined timing (for example, short TTI #4).

Also, referring to FIG. 4A, although the user terminal re-directs only an HARQ-ACK mapped to the long TTI, to the sPUSCH of short TTI #4, but UCI other than HARQ-ACK may be re-directed to the sPUSCH of short TTI #4 as well. Furthermore, although not illustrated, in the sPUSCH of short TTI #4, UCI for a short TTI may be transmitted, in addition to the re-directed UCI.

On the other hand, in the case illustrated in FIG. 4B, the user terminal may transmit the sPUSCH of short TTI #3 and puncture (or drop) only part of the PUSCH of the long TTI (for example, the part corresponding to short TTI #3).

Also, in the case illustrated in FIG. 4B, the user terminal does not have to re-direct the UCI of the long TTI. As shown in FIG. 4B, short TTI #3, in which an sPUSCH is transmitted, includes no HARQ-ACK. In FIG. 4B, only the part of the long-TTI PUSCH corresponding to short TTI #3 is punctured. It then follows that the user terminal does not have to re-direct the UCI of the long TTI to the sPUSCH of short TTI #3, and still, the user terminal can transmit the UCI of the long TTI, with predetermined quality, in non-punctured parts (for example, in symbols apart from short TTI #3 in the long TTI).

According to the second intra-carrier re-directing control, the timing at which a PUSCH of a long TTI carrying UCI of the long TTI and an sPUSCH of a short TTI collide with each other serves as a basis for controlling whether or not to re-direct the UCI to the sPUSCH, so that the increase in the volume of processing in user terminals due to re-direction can be prevented.

As described above, according to the first example, even when a PUSCH of a long TTI carrying UCI of the long TTI and an sPUSCH of a short TTI collide with each other in a same carrier, a user terminal can transmit the UCI properly by using the sPUSCH or the PUSCH in the same carrier.

Second Example

Assuming that that a PUSCH of a long TTI carrying UCI collides with an sPUSCH of a short TTI in one carrier, a second example of the present invention will describe below control for re-directing the UCI to another carrier.

According to the second example of the present invention, when a PUSCH of a long TTI carrying UCI and an sPUSCH of a short TTI collide with each other in one carrier, a user terminal may re-direct at least part of the UCI to a short-TTI sPUSCH of another carrier (first inter-carrier re-directing control). Alternatively, the user terminal may re-direct at least part of the UCI to a long-TTI sPUSCH of another carrier (second inter-carrier re-directing control).

Also, according to the second example, when the above short-TTI sPUSCH and/or the long-TTI PUSCH are allocated (scheduled) to the user terminal in a number of carriers apart from the carrier where the collision takes place, the user terminal may re-direct at least part of the above UCI to an sPUSCH or a PUSCH of the carrier having the lowest (minimum) carrier index.

<First Inter-Carrier Re-Directing Control>

The first inter-carrier re-directing control assumes that, when a long-TTI PUSCH of a given carrier (CC, cell, etc.) is allocated to a user terminal, a short-TTI sPUSCH of another carrier is allocated to the user terminal in that long TTI.

When, in one carrier above, a PUSCH of a long TTI carrying UCI of the long TTI and an sPUSCH of a short TTI collide with each other, the user terminal may re-direct at least part of the UCI (for example, at least HARQ-ACK) to the short-TTI sPUSCH of the other carrier.

Here, the sPUSCH of the short TTI, colliding with the PUSCH of the long TTI, may be allocated to the same user terminal as that of the long-TTI PUSCH, or may be allocated to a different user terminal.

When the PUSCH of the long TTI and the sPUSCH of the short TTI, colliding with each other in one carrier, are allocated to the same user terminal, the user terminal may transmit the short-TTI sPUSCH, and stop (or drop) transmitting the long-TTI PUSCH.

On the other hand, when the PUSCH of the long TTI and the sPUSCH of the short TTI, colliding with each other in one carrier, are allocated to different user terminals, the user terminal, to which the long-TTI PUSCH is allocated, may not stop transmitting the long-TTI PUSCH in the first carrier (the user terminal has only to puncture the colliding part based on the interrupt indication (preemption indication, puncturing indication, etc.) from the radio base station).

Figure 5:
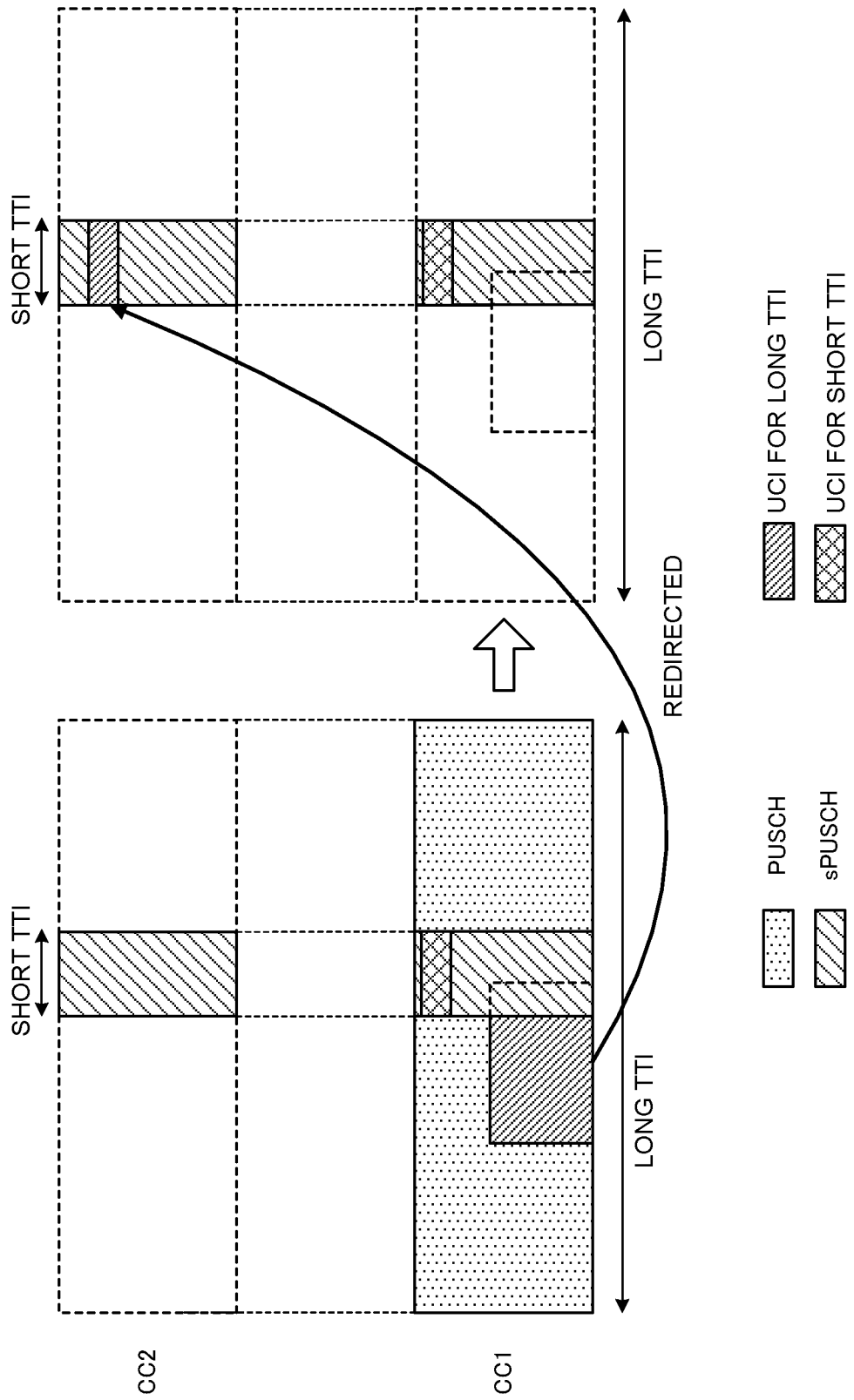
FIG. 5 is a diagram to show an example of first inter-carrier re-directing control according to a second example of the present invention.

FIG. 5 is a diagram to show an example of first inter-carrier re-directing control according to a second example of the present invention. FIG. 5 assumes a case in which, when the PUSCH of the long TTI in CC 1 (also referred to as the "first carrier," "first cell," etc.) is allocated to the user terminal, the sPUSCH of the short TTI in CC 2 (also referred to as the "second carrier," "second cell," etc.) is allocated to the user terminal in the long TTI.

Furthermore, FIG. 5 assumes that the PUSCH of the long TTI and the sPUSCH of the short TTI, which are allocated to the same user terminal, collide with each other in CC 1. Furthermore, FIG. 5 assumes that the UCI of the long TTI is piggy-backed on the PUSCH of the long TTI of CC 1, and the UCI of the short TTI is piggy-backed on the sPUSCH of the short TTI of CC 1.

In the case illustrated in FIG. 5, the user terminal may re-direct at least part of the UCI of CC 1's long TTI (for example, at least HARQ-ACK) to the sPUSCH of the short TTI of CC 2. Note that the user terminal does not have to re-direct the whole of the UCI of the long TTI. For example, the user terminal may drop part of the UCI (for example, CSI which is at least one of CQI, PMI and RI) without re-directing it.

Also, in FIG. 5, in CC 1, the PUSCH of the long TTI and the sPUSCH of the short TTI are allocated to the same user terminal, so that the user terminal transmits the short-TTI sPUSCH of CC 1 and the short-TTI sPUSCH of CC 2, and stops (drop) transmitting the long-TTI PUSCH of CC 1.

According to the first inter-carrier re-directing control, when a PUSCH of a long TTI carrying UCI and an sPUSCH of a short TTI collide with each other in one carrier, at least part of the UCI of the long TTI is re-directed to an sPUSCH for another carrier's short TTI, so that a user terminal can transmit the UCI properly.

<Second Inter-Carrier Re-Directing Control>

The second inter-carrier re-directing control assumes that, when a long-TTI PUSCH of a given carrier is allocated to a user terminal, another carrier's PUSCH is allocated to the user terminal in that long TTI.

When a PUSCH of a long TTI carrying UCI and an sPUSCH of a short TTI collide with each other in one carrier above, the user terminal may re-direct at least part of the UCI (for example, at least HARQ-ACK) to a long-TTI PUSCH of the other carrier.

Here, the sPUSCH of the short TTI, colliding with the PUSCH of the long TTI in one carrier above, may be allocated to the same user terminal as that of the long-TTI PUSCH, or may be allocated to a different user terminal.

When the PUSCH of the long TTI and the sPUSCH of the short TTI, colliding with each other in one carrier above, are allocated to the same user terminal, the user terminal may transmit the short-TTI sPUSCH, and stop (or drop) transmitting the long-TTI PUSCH.

On the other hand, when the PUSCH of the long TTI and the sPUSCH of the short TTI, colliding with each other in one carrier above, are allocated to different user terminals, the user terminal, to which the long-TTI PUSCH is allocated, may not stop transmitting the long-TTI PUSCH (the user terminal has only to puncture the colliding part based on the interrupt indication (preemption indication, puncturing indication, etc.) from the radio base station).

Figure 6:
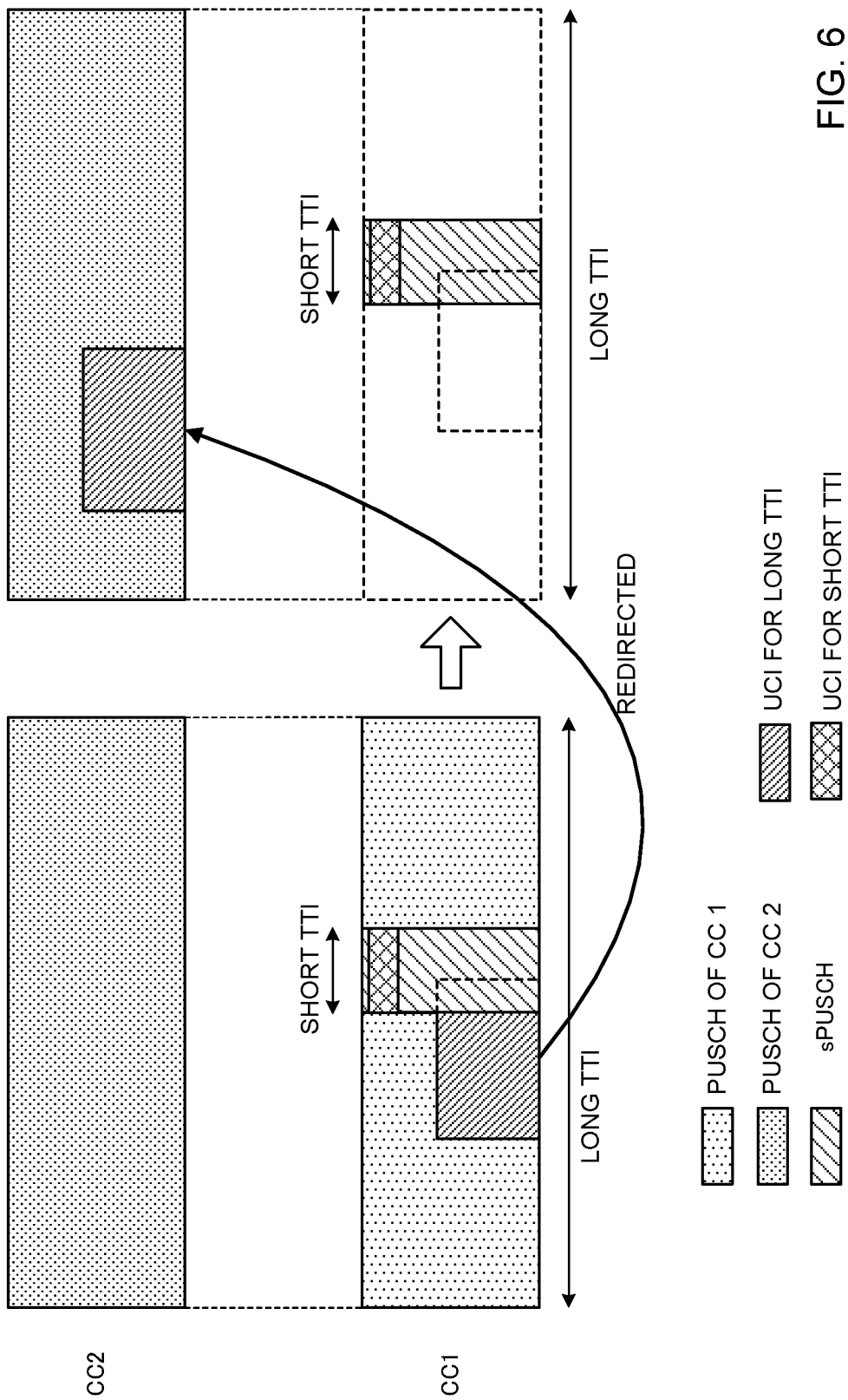
FIG. 6 is a diagram to show an example of second inter-carrier re-directing control according to the second example.

FIG. 6 is a diagram to show an example of second inter-carrier re-directing control according to the second example. FIG. 6 assumes that, when the long-TTI PUSCH of CC 1 is allocated to the user terminal, the PUSCH of CC 2 is allocated to the user terminal in that long TTI. That is, it is assumed that the user terminal runs UL carrier aggregation (CA) or dual connectivity (DC) in CC 1 and CC 2.

Furthermore, FIG. 6 assumes that the PUSCH of the long TTI and the sPUSCH of the short TTI, which are allocated to the same user terminal, collide with each other in CC 1. Furthermore, FIG. 6 assumes that the UCI of the long TTI is piggy-backed on the PUSCH of the long TTI of CC 1, and the UCI of the short TTI is piggy-backed on the sPUSCH of the short TTI of CC 1.

In the case illustrated in FIG. 6, the user terminal may re-direct at least part of the UCI of CC 1's long TTI (for example, at least HARQ-ACK) to the PUSCH of CC 2. Note that the user terminal may re-direct the whole of the UCI of the long TTI, or drop part of the UCI without re-directing it (for example, CSI, which is at least one of CQI, PMI and RI).

Also, in FIG. 6, in CC 1, the PUSCH of the long TTI and the sPUSCH of the short TTI are allocated to the same user terminal, so that the user terminal transmits the short-TTI sPUSCH of CC 1 and the long-TTI sPUSCH of CC 2, and stops (drop) transmitting the long-TTI PUSCH of CC 1.

According to the second inter-carrier re-directing control, when a PUSCH of a long TTI carrying UCI and an sPUSCH of a short TTI collide with each other in one carrier, at least part of the UCI is re-directed to another carrier's long-TTI PUSCH, so that a user terminal can transmit the UCI properly.

Other Examples

As described above, in the first and/or second example, when a PUSCH of a long TTI and an sPUSCH of a short TTI collide with each other in one carrier, a user terminal may stop (or drop) transmitting the long-TTI PUSCH.

Here, stopping (or dropping) the transmission of the long-TTI's PUSCH may mean stopping (or dropping) transmitting at least part of the PUSCH. FIG. 7 are diagrams to show examples of stopping (or dropping) transmission of a PUSCH of a long TTI, according to another example of the present invention.

Figures 7A, 7B, 7C:
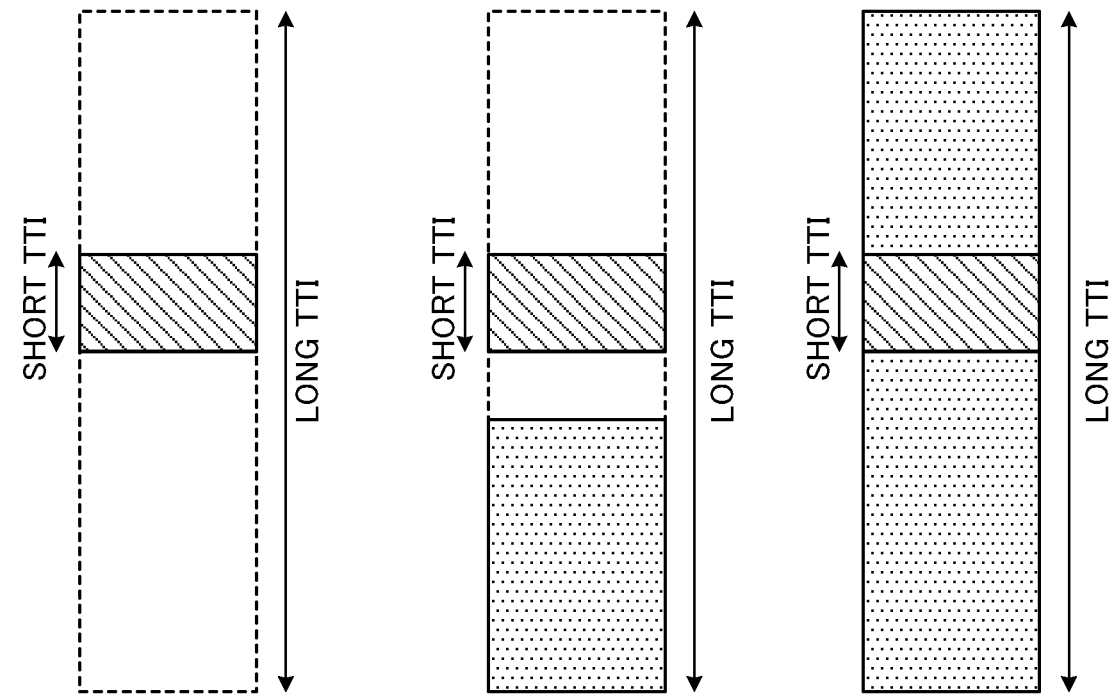
FIGS. 7A to 7C are diagrams to show examples of stopping (or dropping) transmission of a PUSCH of a long TTI, according to another example of the present invention.

As shown to FIG. 7A, when a PUSCH of a long TTI and an sPUSCH of a short TTI collide with each other in one carrier, a user terminal may transmit the sPUSCH of the short TTI, and drop the PUSCH of the long TTI entirely.

Alternatively, as shown in FIG. 7B, when a PUSCH of a long TTI and an sPUSCH of a short TTI collide with each other in one carrier, a user terminal may transmit the short-TTI PUSCH, transmit the long-TTI PUSCH up until a predetermined timing, and drop the long-TTI PUSCH after the predetermined timing.

Alternatively, as shown in FIG. 7C, when a PUSCH of a long TTI and an sPUSCH of a short TTI collide with each other in one carrier, a user terminal may transmit the short-TTI sPUSCH, drop only the part of the long-TTI PUSCH that has collided with the sPUSCH, and transmit the part that did not collide.

In this way, when a PUSCH of a long TTI and an sPUSCH of a short TTI collide with each other in one carrier, the transmission of the long-TTI's PUSCH may be controlled depending on the implementation of the user terminal, as long as the short-TTI sPUSCH is transmitted with predetermined quality.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 8:
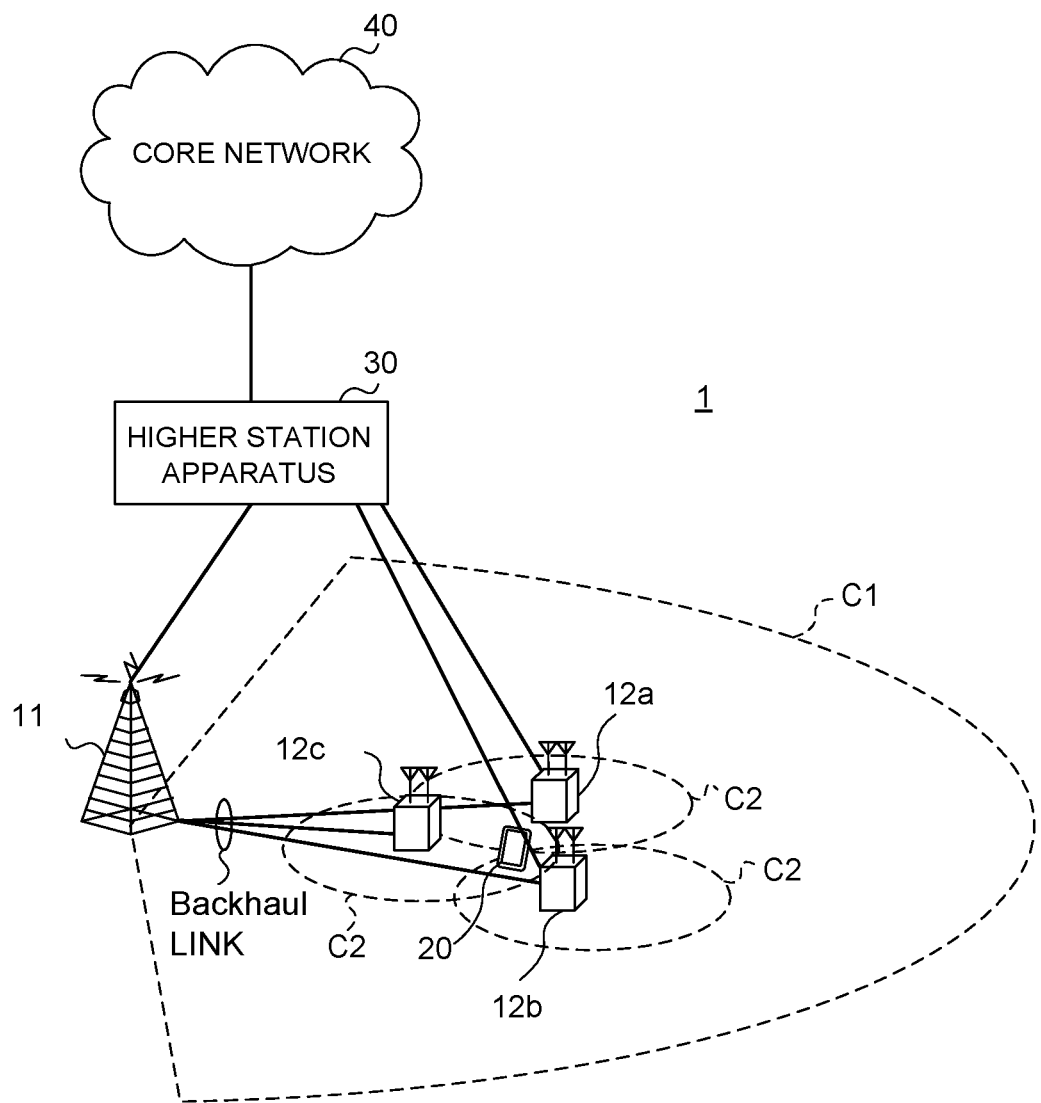
FIG. 8 is a diagram to show an exemplary schematic structure of a radio communication system according to the present embodiment.

FIG. 8 is a diagram to show an exemplary schematic structure of a radio communication system according to the present embodiment. A radio communication system 1 can adopt carrier aggregation (CA), which groups a number of fundamental frequency blocks (component carriers (CCs)) into one, where an LTE system bandwidth (for example, 20 MHz) is used as 1 unit, and/or dual connectivity (DC). Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A structure in which different numerologies are applied between cells may be adopted here. Note that a "numerology" refers to a set of communication parameters that characterize the design of signals in a given RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Also, in each cell (carrier), either subframes having a relatively long time length (for example, 1 ms) (also referred to as "TTIs," "normal TTIs," "long TTIs," "normal subframes," "long subframes," "slots," and/or the like), or subframes having a relatively short time length (also referred to as "short TTIs," "short subframes," "slots" and/or the like) may be applied, or both long subframes and short subframe may be used. Furthermore, in each cell, subframes of two or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL. Also, SC-FDMA can be applied to a side link (SL) that is used in inter-terminal communication.

DL channels that are used in radio communication system 1 include DL data channel that is shared by each user terminal 20 (also referred to as "PDSCH (Physical Downlink Shared CHannel)," "DL shared channel" and so forth), a broadcast channel (PBCH (Physical Broadcast CHannel)), L1/L2 control channels and so on. At least one of user data, higher layer control information, SIBs (System Information Blocks) and so forth is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (also referred to as "A/N," "HARQ-ACK," "HARQ-ACK bit," "A/N code book" and so on) can be communicated using at least one of the PHICH, the PDCCH and the EPDCCH.

UL channels that are used in the radio communication system 1 include UL data channel that is shared by each user terminal 20 (also referred to as "PUSCH (Physical Uplink Shared CHannel)," "UL shared channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N, HARQ-ACK) for the PDSCH, channel state information (CSI) and so on is communicated in the PUSCH or the PUCCH. By means of the PRACH, random access preambles for establishing connections with cells are communicated.

(Radio Base Station)

Figure 9:
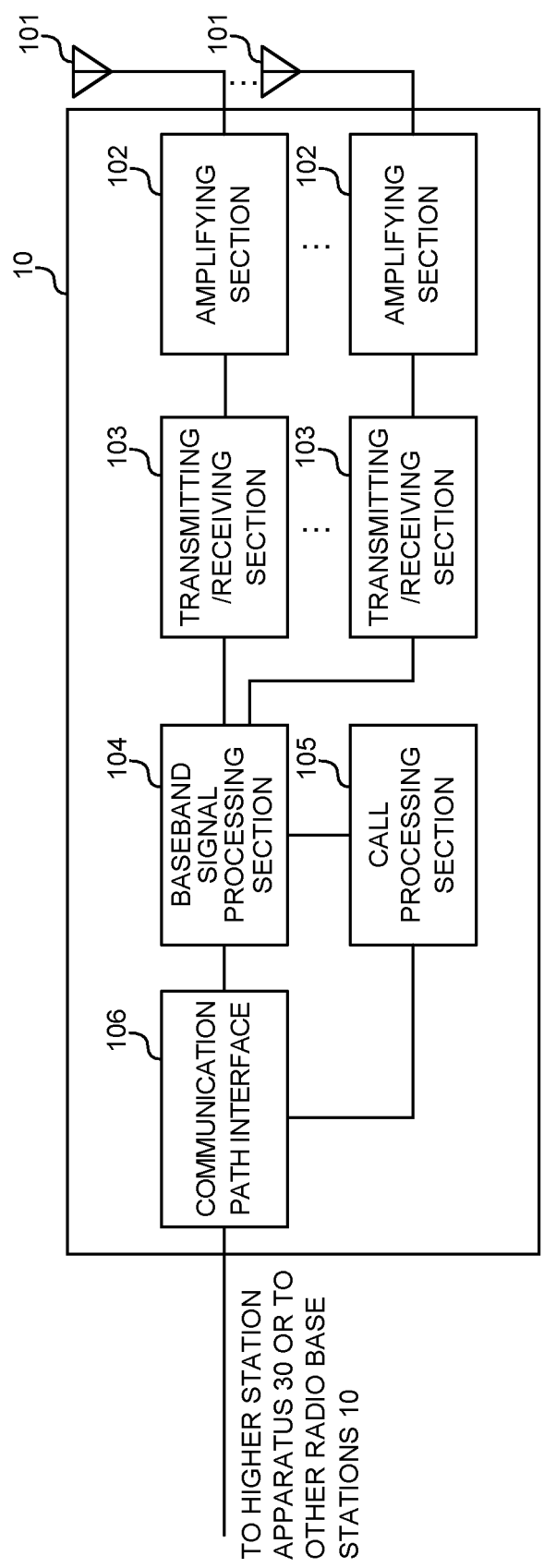
FIG. 9 is a diagram to show an exemplary overall structure of a radio base station according to the present embodiment.

FIG. 9 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Also, the transmitting/receiving sections 103 transmit DL signals (for example, at least one of DCI (including at least one of DL assignment, UL grant and common DCI), DL data, an interrupt indication, a puncturing indication and a preemption indication) and receive UL signals (for example, UL data, UCI, etc.) in long TTIs (first TTIs) and/or short TTIs (second TTIs).

Figure 10:
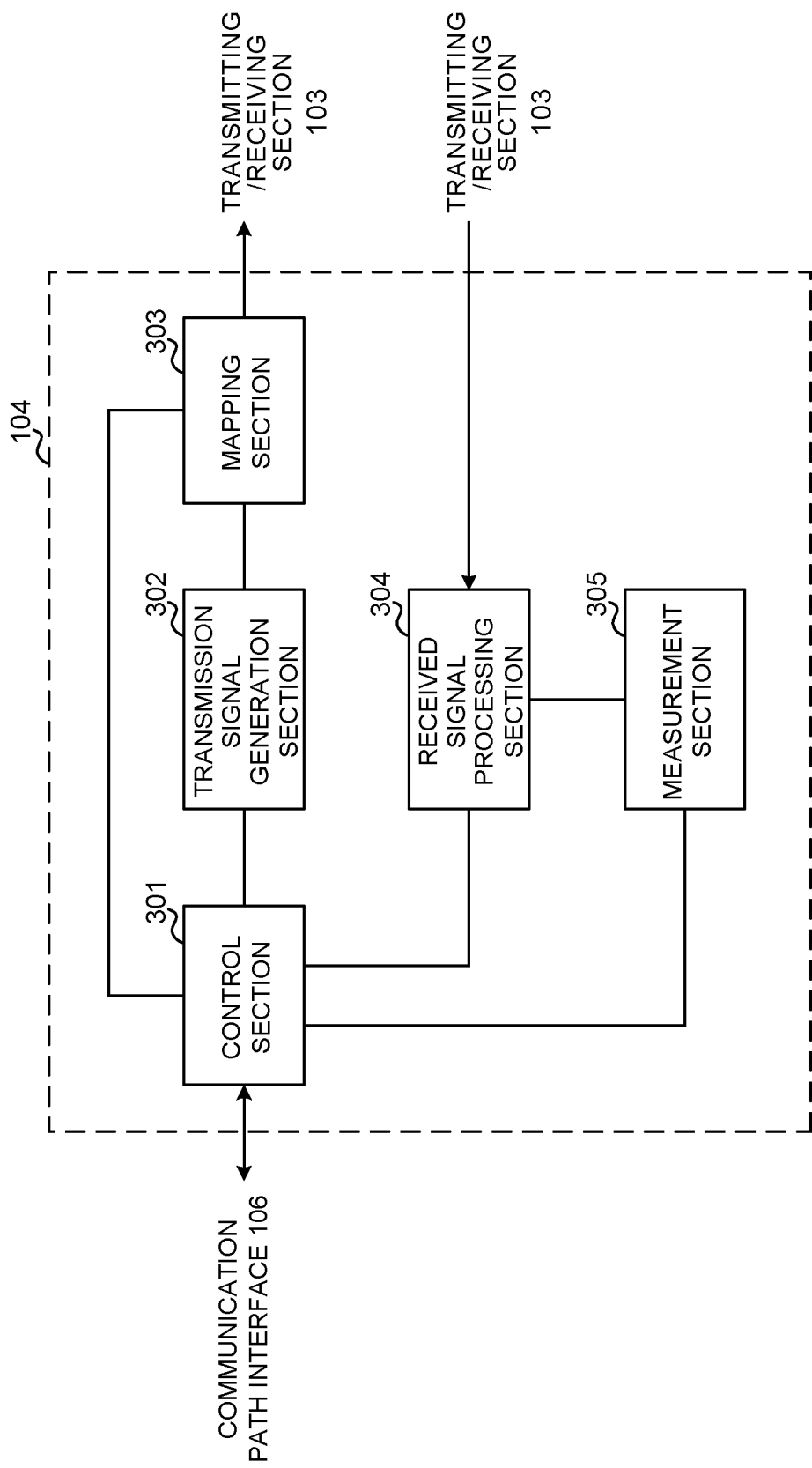
FIG. 10 is a diagram to show an exemplary functional structure of a radio base station according to the present embodiment.

FIG. 10 is a diagram to show an exemplary functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 schedules long TTIs and/or short TTIs. The control section 301 may control DCI transmission processes (for example, coding, modulation, transmission, etc.) using a DL control channel (also referred to as a "scheduling control channel," etc.) in long TTIs and/or short TTIs.

The control section 301 also controls the transmission of DL signals and/or the receipt of UL signals in long TTIs and/or short TTIs. To be more specific, the control section 301 may control DL data transmission processes (for example, coding, modulation, mapping, transmission, etc.) and/or UL data receiving processes (for example, receipt, demapping, demodulation, decoding, etc.) in long TTIs and/or short TTIs.

Also, the control section 301 controls the transmission of retransmitting data of DL data. To be more specific, when part of a long TTI's DL data is preempted (punctured) by a short TTI's transmission, the control section 301 may control the transmission of retransmitting data without delivery acknowledgment information (HARQ-ACK) from the user terminal 20. Note that DL data may be comprised of a transport block (TB) that includes one or more code blocks (CBs), and retransmitting data may include at least part of the DL data (for example, all of the CBs, the part that is preempted, or the whole TB).

In addition, the control section 301 may control re-directing, when a PUSCH of a long TTI carrying UCI and an sPUSCH of a short TTI collide with each other in one carrier. For example, the control section 301 may control the generation and transmission of configuration information related to re-directing.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded from the control section 301, and outputs this to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for UL signals transmitted from the user terminal 20. For example, the received signal processing section 304 may perform the decoding process in units of CBs based on commands from the control section 301.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on UL control channel configuration commanded from the control section 301.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 11:
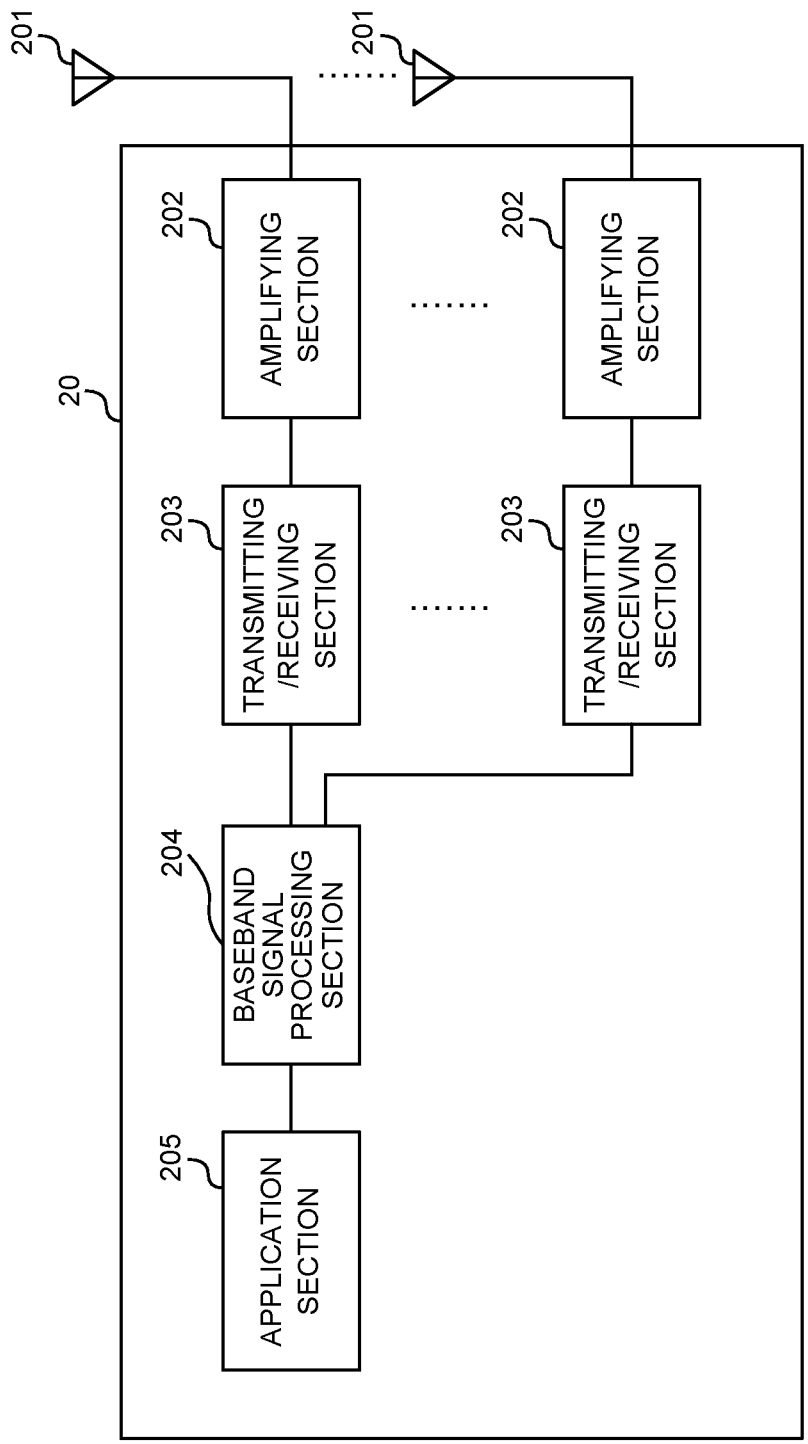
FIG. 11 is a diagram to show an exemplary overall structure of a user terminal according to the present embodiment.

FIG. 11 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DL signals (for example, at least one of DCI, DL data, an interrupt indication, a puncturing indication and a preemption indication) in long TTIs (first TTIs) and/or short TTIs (second TTIs). Also, the transmitting/receiving sections 203 transmit UL signals (for example, UL data, UCI, etc.) in long TTIs and/or short TTIs.

A transmitting/receiving sections 203 can be constituted by a transmitter/receiver, a transmitting/receiving circuit or transmitting/receiving apparatus that can be described based on general understanding of the technical field to which the present invention pertains. Furthermore, a transmitting/receiving sections 203 may be structured as 1 transmitting/receiving section, or may be formed with a transmitting section and a receiving section.

Figure 12:
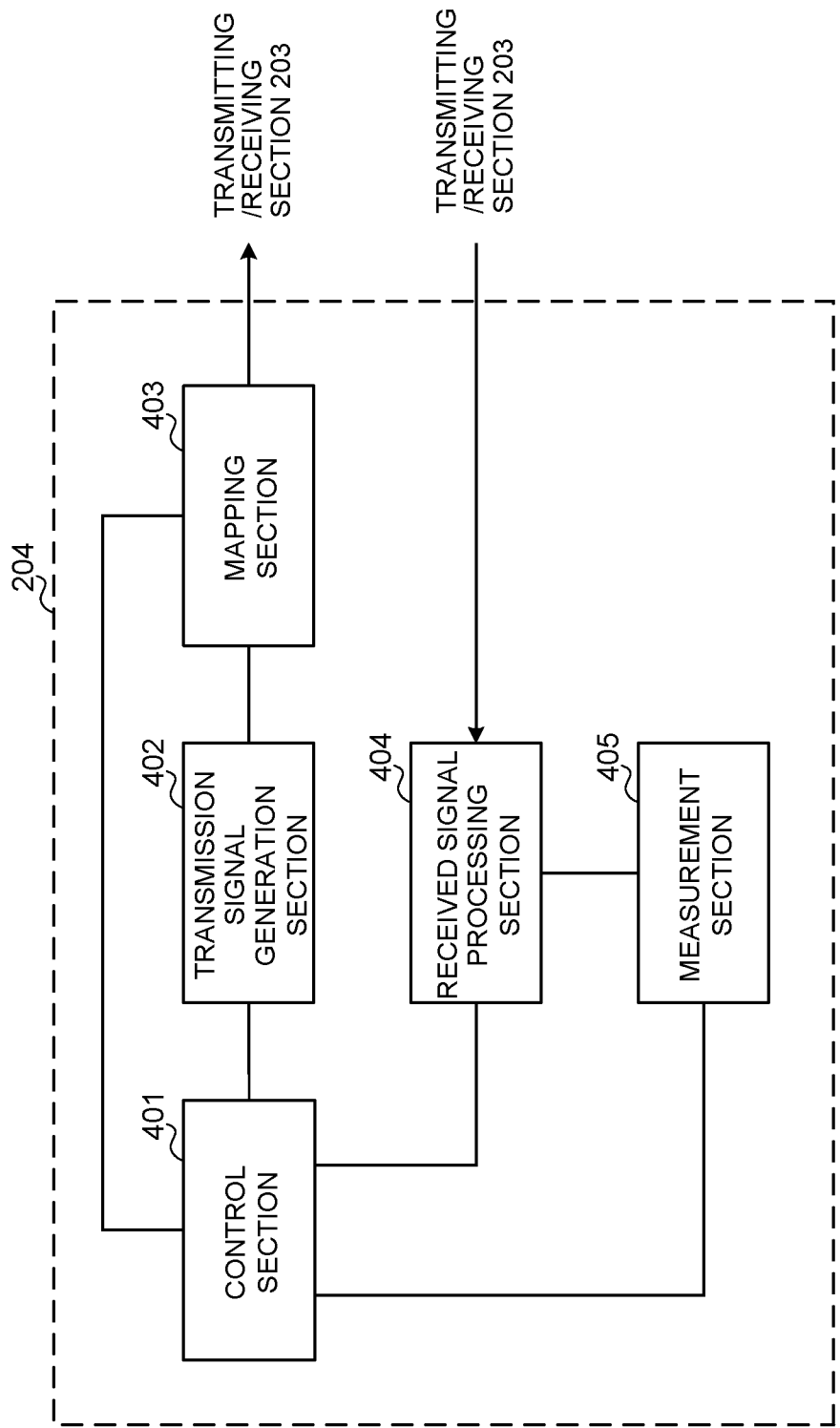
FIG. 12 is a diagram to show an exemplary functional structure of a user terminal according to the present embodiment.

FIG. 12 is a diagram to show an exemplary functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

To be more specific, the control section 401 may monitor (blind-decode) a DL control channel of a long TTI and/or a short TTI, and detect the DCI of the long TTI and/or the short TTI DCI for the user terminal 20.

Furthermore, the control section 401 controls the receipt of DL signals and/or the transmission of UL signals in long TTIs and/or short TTIs. To be more specific, the control section 401 may control DL data receiving processes (for example, receipt, demapping, demodulation, decoding, etc.) and/or UL data transmission processes (for example, coding, modulation, mapping, transmission, etc.) in long TTIs and/or short TTIs.

Furthermore, the control section 401 controls the transmission of the UCI of the long TTI and/or the short TTI. To be more specific, when a PUSCH of a long TTI carrying UCI and an sPUSCH of a short TTI collide with each other in the same carrier, the control section 401 may control the re-direction of at least part of the UCI.

For example, when a PUSCH of a long TTI carrying UCI and an sPUSCH of a short TTI collide with each other in a same carrier, the control section 401 may re-direct at least part of the UCI to the sPUSCH of the short TTI, regardless of at what timing the collision occurs (see the first example, the first intra-carrier re-directing control and FIG. 2).

Also, when a PUSCH of a long TTI carrying UCI and an sPUSCH of a short TTI collide with each other in a same carrier, the control section 401 may control whether or not to re-direct at least part of the UCI to the sPUSCH of the short TTI, based on the timing the collision takes place (see the first example, the second intra-carrier re-directing control and FIG. 4).

In addition, when a PUSCH of a long TTI carrying UCI and an sPUSCH of a short TTI collide with each other in a same carrier, the control section 401 may re-direct at least part of the UCI to a short-TTI sPUSCH of another carrier (see the second example, the first inter-carrier re-directing control, and FIG. 5).

In addition, when a PUSCH of a long TTI carrying UCI and an sPUSCH of a short TTI collide with each other in a same carrier, the control section 401 may re-direct at least part of the UCI to a long-TTI PUSCH of another carrier (see the second example, the second inter-carrier re-directing control, and FIG. 6).

Furthermore, when a PUSCH of a long TTI carrying UCI and an sPUSCH of a short TTI collide with each other in the same carrier, the control section 401 may control stopping (or dropping or puncturing) the transmission of the long-TTI PUSCH. Also, the control section 401 may control the transmission of the short-TTI sPUSCH.

The control section 401 can be constituted by a controller, a control circuit or control apparatus that can be described based on general understanding of the technical field to which the present invention pertains.

The transmission signal generation section 402 generates retransmission control information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generating circuit or signal generating apparatus that can be described based on general understanding of the technical field to which the present invention pertains.

The mapping section 403 maps the retransmission control information for UL signals and DL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes of DL signals (including, for example, at least one of demapping, demodulation and decoding). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, higher layer control information to be sent in higher layer signaling, L1/L2 control information (for example, UL grant and/or DL assignment) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 13:
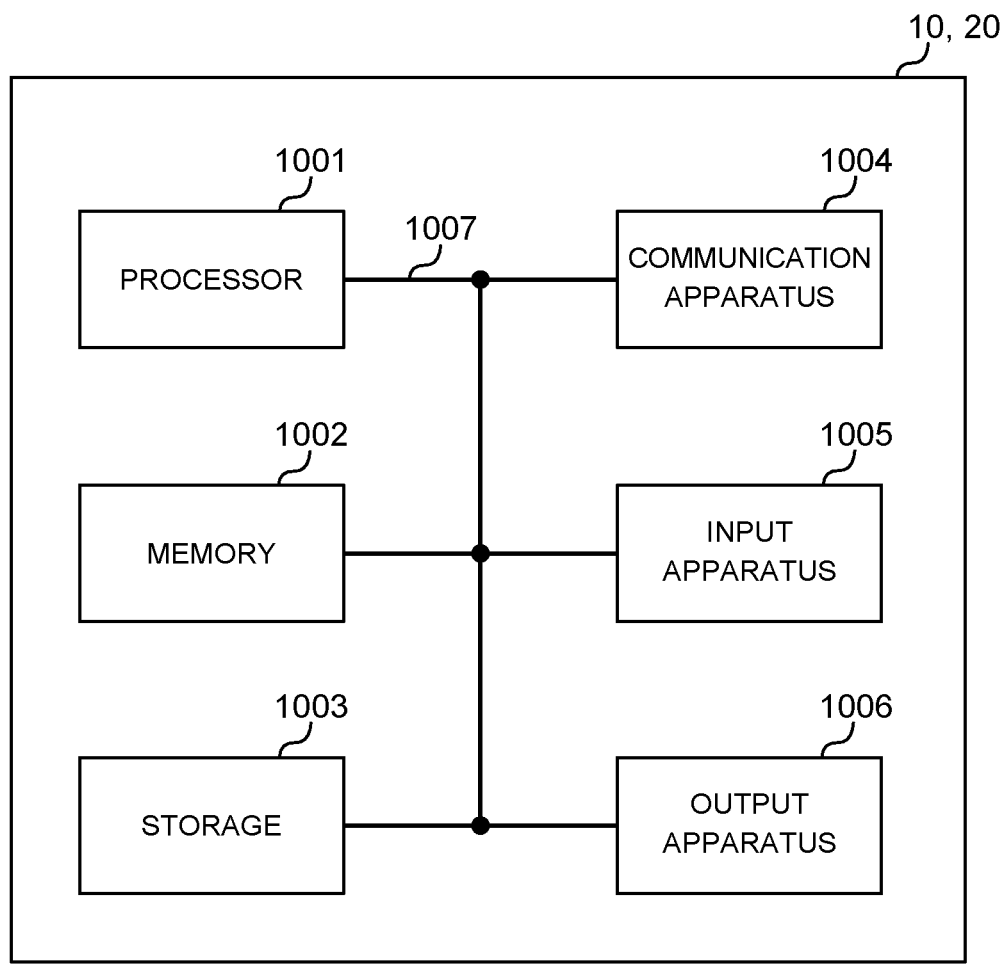
FIG. 13 is a diagram to show an exemplary hardware structure of a radio base station and a user terminal according to the present embodiment.

For example, the radio base station, user terminals and so on according to the present embodiment mode may function as a computer that executes the processes of the radio communication method of the present invention. FIG. 13 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with one processor, or processes may be implemented simultaneously, in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, and to control at least one of communication by communication apparatus 1004, reading and writing of data in the memory 1002 and the storage 1003, and so forth.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 13 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time length (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are simply examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a transmitter configured to transmit a first physical uplink shared channel (PUSCH) using a first period and a second PUSCH using a second period that is shorter than the first period; and
a processor configured to, when the first PUSCH and the second PUSCH overlap in time, control a dropping of at least a part of the first PUSCH, based on a timing of the overlapping,
wherein the processor is configured to control to drop the part of the first PUSCH that is subjected to transmission after a certain timing, the certain timing being before start of the timing of the overlapping.

2. A radio communication method for a terminal comprising:
transmitting a first physical uplink shared channel (PUSCH) using a first period and a second PUSCH using a second period that is shorter than the first period; and
when the first PUSCH and the second PUSCH overlap in time, controlling a dropping of at least a part of the first PUSCH, based on a timing of the overlapping, wherein the terminal performs a control to drop the part of the first PUSCH that is subjected to transmission after a certain timing, the certain timing being before start of the timing of the overlapping.

3. A system comprising a terminal and a base station, wherein the terminal comprises:
- a transmitter configured to transmit a first physical uplink shared channel (PUSCH) using a first period and a second PUSCH using a second period that is shorter than the first period; and
- a processor configured to, when the first PUSCH and the second PUSCH overlap in time, control a dropping of at least a part of the first PUSCH, based on a timing of the overlapping,
- wherein the processor is configured to control to drop the part of the first PUSCH that is subjected to transmission after a certain timing, the certain timing being before start of the timing of the overlapping, and
- the base station comprises a receiver configured to receive the first PUSCH and the second PUSCH.

* * * * *